(12) United States Patent
Haubenschild et al.

(10) Patent No.: US 7,829,838 B2
(45) Date of Patent: Nov. 9, 2010

(54) MOBILE HIGH BAY STORAGE SYSTEM HAVING VEHICLE GUIDANCE SYSTEM

(75) Inventors: Mark P. Haubenschild, Fort Atkinson, WI (US); Brian R. Nemec, Delavan, WI (US); Matthew A. Tourdot, Whitewater, WI (US); Brian P. Bourke, Jefferson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 239 days.

(21) Appl. No.: 12/132,470

(22) Filed: Jun. 3, 2008

(65) Prior Publication Data

US 2008/0303387 A1 Dec. 11, 2008

Related U.S. Application Data

(60) Provisional application No. 60/942,093, filed on Jun. 5, 2007.

(51) Int. Cl.
  *A47B 53/00* (2006.01)
  *G01V 9/00* (2006.01)
  *B61B 12/00* (2006.01)
(52) U.S. Cl. ............. 250/221; 250/222.1; 312/201
(58) Field of Classification Search ............ 250/221, 250/222.1; 312/198, 201, 223.5, 294, 295, 312/298, 301
See application file for complete search history.

(56) References Cited

U.S. PATENT DOCUMENTS

| | | | |
|---|---|---|---|
| 3,908,831 A * | 9/1975 | Brendgord | 211/88.01 |
| 3,961,831 A * | 6/1976 | Showell et al. | 312/200 |
| 4,153,312 A * | 5/1979 | Taniwaki | 312/198 |
| 4,437,711 A | 3/1984 | Dahnert | |
| 4,650,264 A | 3/1987 | Dahnert | |
| 4,733,923 A | 3/1988 | Dahnert | |
| 4,743,078 A | 5/1988 | Dahnert | |
| 4,773,807 A * | 9/1988 | Kroll et al. | 414/282 |
| 4,975,804 A | 12/1990 | Dahnert et al. | |
| 5,005,923 A | 4/1991 | Dahnert | |
| 5,044,703 A | 9/1991 | Dahnert | |
| 5,121,975 A | 6/1992 | Dahnert | |
| 5,359,191 A | 10/1994 | Griesemer et al. | |
| 5,404,087 A * | 4/1995 | Sherman | 318/587 |
| 5,417,487 A | 5/1995 | Dahnert | |
| 5,427,444 A | 6/1995 | Griesemer | |
| 5,569,910 A | 10/1996 | Griesemer | |

(Continued)

*Primary Examiner*—John R Lee
(74) *Attorney, Agent, or Firm*—Andrus, Sceales, Starke & Sawall, LLP

(57) ABSTRACT

A mobile storage unit system includes a vehicle guide arrangement that navigates a forklift or other vehicle along aisles formed between mobile storage units. The vehicle guide arrangement allows an operator to identify the aisle containing a desired loading or unloading point and the guide arrangement defines a path of travel for the vehicle along that aisle to ensure that the vehicle has sufficient room to perform the loading and unloading functions. The mobile storage unit system may also include one or more perceptible indicators, such as lamps, that provide the operator a signal when an aisle is fully open and ready to receive the vehicle. A corresponding signal may also be provided to the vehicle guide arrangement so that the vehicle is not navigated along an aisle until the aisle is fully open. This ensures that the vehicle has the space needed to maneuver during the loading and unloading process.

23 Claims, 6 Drawing Sheets

U.S. PATENT DOCUMENTS

| | | | |
|---|---|---|---|
| 5,764,014 A * | 6/1998 | Jakeway et al. | 318/587 |
| 6,345,217 B1 * | 2/2002 | Zeitler et al. | 701/23 |
| 6,445,984 B1 * | 9/2002 | Kellogg | 701/23 |
| 6,669,314 B1 * | 12/2003 | Nemec et al. | 312/201 |
| 6,840,022 B1 * | 1/2005 | Manogue et al. | 52/745.2 |
| 7,257,925 B2 * | 8/2007 | Manogue et al. | 52/29 |
| 7,370,587 B2 * | 5/2008 | Janson et al. | 104/106 |
| 7,508,145 B2 * | 3/2009 | Bourke et al. | 318/34 |
| 7,583,037 B2 * | 9/2009 | Bourke et al. | 318/34 |
| 2004/0104647 A1 * | 6/2004 | Nemec et al. | 312/201 |
| 2005/0028481 A1 * | 2/2005 | Manogue et al. | 52/741.1 |
| 2006/0124025 A1 * | 6/2006 | Janson et al. | 105/96 |
| 2006/0232174 A1 * | 10/2006 | Muth et al. | 312/198 |
| 2007/0170824 A1 * | 7/2007 | Bourke et al. | 312/201 |
| 2007/0296265 A1 * | 12/2007 | Bourke et al. | 303/3 |
| 2008/0111060 A1 * | 5/2008 | Tourdot et al. | 250/221 |
| 2008/0133046 A1 * | 6/2008 | Tourdot et al. | 700/214 |
| 2008/0303387 A1 * | 12/2008 | Haubenschild et al. | 312/201 |
| 2009/0120321 A1 * | 5/2009 | Tourdot et al. | 104/139 |
| 2009/0196716 A1 * | 8/2009 | Rebstock | 414/222.01 |

* cited by examiner

MOBILE HIGH BAY STORAGE SYSTEM HAVING VEHICLE GUIDANCE SYSTEM

CROSS-REFERENCE TO RELATED APPLICATION

The present application claims the benefit of U.S. Ser. No. 60/942,093 filed Jun. 5, 2007, the disclosure of which is incorporated herein.

BACKGROUND OF THE INVENTION

The present invention relates generally to storage systems and, more particularly, to a mobile high bay storage system in which storage units are movable along a storage unit guide arrangement to selectively form an aisle between adjacent storage units along which a vehicle may be guided by a vehicle guide arrangement. The storage system may also include a perceptible indicator that signals when an aisle is fully open and thus ready to receive the vehicle.

Industrial rack systems are commonly used in storage facilities to store products until those products are shipped either directly to a consumer or to a retailer. Typically, the industrial racks store loaded pallets that are placed on and removed from the racks using a forklift or similar work vehicle. The industrial racks are spaced from one another in a manner to form relatively wide aisles to allow sufficient room for the forklift to load and remove the pallets. Since each industrial rack has a fixed position, each industrial rack must have a dedicated aisle. Moreover, since each aisle is typically as wide, if not wider than, the rack itself, more than half the floor space occupied by the industrial rack system may be occupied by aisles and thus not usable for product storage.

Mobile industrial rack systems, however, are designed to reduce the number of fixed aisles and, as a result, increase the amount of floor space used for product storage. More particularly, in a typical configuration, a single aisle may be allocated for the entire industrial rack system. The position of that single aisle can be changed by moving the industrial racks along a track or rail that is mounted or otherwise secured to the storage facility flooring, which is typically a concrete slab. While in some configurations each industrial rack is moved independently, it is common for back-to-back industrial racks to be coupled using a rigid flue spacer connector and moved as a single unit by a single mobile carriage supporting both racks. To access a forward rack of a given back-to-back configuration, the racks are moved such that an aisle is formed immediately forward of the back-to-back configuration. To access a rearward rack of the given back-to-back configuration, the racks are moved such that an aisle is formed immediately rearward of the back-to-back configuration. Thus, mobile industrial rack systems provide nearly twice the storage capacity of a similarly sized fixed rack system.

Stationary storage racks are spaced sufficiently from one another to define an aisle that is wide enough for the vehicle to be moved down the aisle and unload or load a pallet with room for the vehicle to maneuver as needed. In a mobile storage unit system however, the position of an open aisle changes as the individual storage units are moved. Thus, the vehicle operator must be cognizant of the spacing between those storage units between which an aisle is formed. If the vehicle is entered into an aisle that is not fully open or is entered along an imprudent path, the operator may find that the vehicle does not have sufficient room to perform the desired loading or unloading functions.

SUMMARY OF THE INVENTION

The present invention provides a mobile storage unit system that includes a vehicle guide arrangement that navigates a forklift or other vehicle along aisles formed between mobile storage units. The vehicle guide arrangement allows an operator to identify the aisle containing a desired loading or unloading point and the guide arrangement defines a path of travel for the vehicle along that aisle to ensure that the vehicle has sufficient room to perform the loading and unloading functions.

The mobile storage unit system may also include one or more perceptible indicators, such as lamps, that provide the operator a signal when an aisle is fully open and ready to receive the vehicle. A corresponding signal may also be provided to the vehicle guide arrangement so that the vehicle is not navigated along an aisle until the aisle is fully open. This ensures that the vehicle has the space needed to maneuver during the loading and unloading process.

It is therefore an object of the invention to provide a system that defines a path of travel for a vehicle, such as a forklift, along aisles formed between mobile storage units. It is a further object of the invention to limit navigation of a vehicle to aisles that are fully open.

According to one aspect of the present invention, a mobile storage system is provided and includes a support surface and a plurality of mobile storage units. The system further includes a storage unit guide arrangement for guiding movement of the mobile storage units relative to the support surface. The mobile storage units are movable via the storage unit guide arrangement to selectively form at least one aisle between adjacent storage units. A vehicle guide arrangement is associated with the support surface for guiding movement of a vehicle in each aisle between adjacent storage units.

In accordance with another aspect of the invention, a storage method includes movably mounting a plurality of storage units relative to a support surface and providing a vehicle for selectively placing items on and retrieving items from the storage units. The method also includes selectively moving the storage units to form an aisle between a pair of adjacent storage units and guiding movement of the vehicle along a predefined path formed along the support surface within the aisle.

According to a yet a further aspect of the invention, a mobile storage system includes a support surface and a plurality of mobile storage units supported by the support surface. A storage unit guide arrangement is provided for guiding movement of the mobile storage units relative to the support surface. The mobile storage units are movable via the storage unit guide arrangement such that at least one storage unit in each pair of adjacent storage units is movable from a closed position throughout a range of partially open positions to a fully open position in which an aisle is formed between the pair of adjacent storage units. An indicator is associated with each adjacent pair of storage units and provides a perceptible indication that the storage units are in the fully open position.

According to a further aspect, the invention is embodied in a storage method that includes the acts of movably mounting a plurality of storage units relative to a support surface and selectively moving the storage units to form an aisle between a pair of adjacent storage units by moving at least one of the storage units in each adjacent pair of storage units from a closed position throughout a range of partially open positions to a fully open position in which the aisle is formed. The storage method further includes the act of providing a perceptible indication when the storage units are in the fully open position to form the aisle.

Various other features, objects, aspects, and advantages of the invention will be made apparent from the following description taken together with the drawings.

BRIEF DESCRIPTION OF THE DRAWINGS

The drawings illustrate the best mode presently contemplated of carrying out the invention. In the drawings.

DETAILED DESCRIPTION

Figure 1:
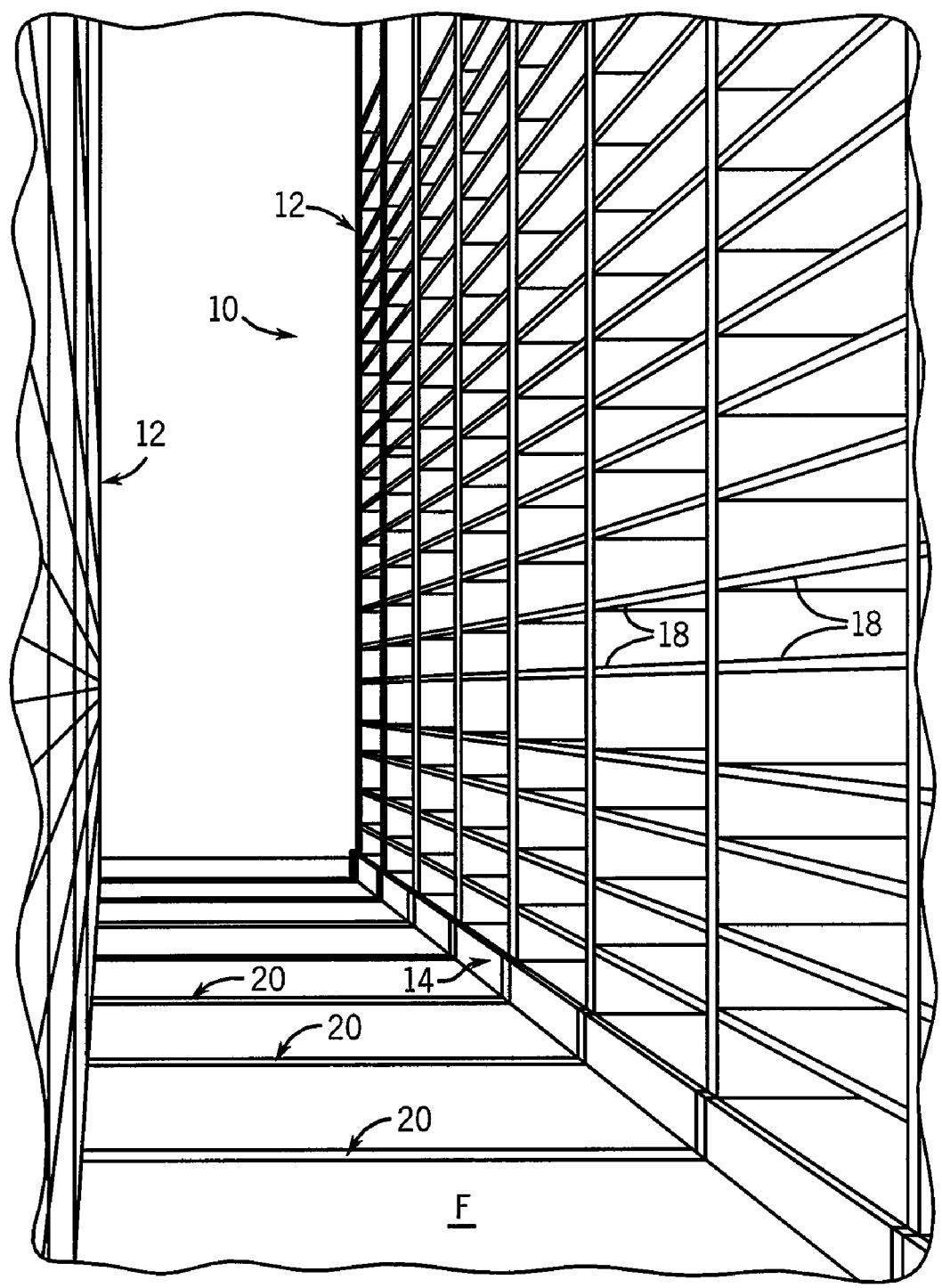
FIG. 1 is an isometric view of a mobile storage unit system according to one embodiment of the invention.

A mobile high bay storage system 10 generally includes a series of storage units 12, which are arranged in rows in a storage room or facility, as shown in FIG. 1. Mobile high bay storage system 10 is particularly well suited for high density storage of records or other items in an off-site storage facility, although it is understood that mobile high bay storage system 10 may be employed in any satisfactory environment.

Each storage unit 12 is secured at its lower end to a mobile carriage 14, for providing movement of the storage units 12 relative to a support surface such as a floor. In the illustrated embodiment, each storage unit 12 includes a frame 16 and a series of storage members, in the form of shelves 18, which are operable to support items for storage above carriage 14. It is understood, however, that storage members other than shelves may be employed in storage system 10. A series of rails 20 are secured to the floor, shown at F, in a manner to be explained, and carriages 14 are movable on rails 20 in order to selectively form an aisle A between an adjacent pair of storage units 12. Each carriage 14 may have any desired length according to the application in which storage system 10 is employed.

Figure 2:
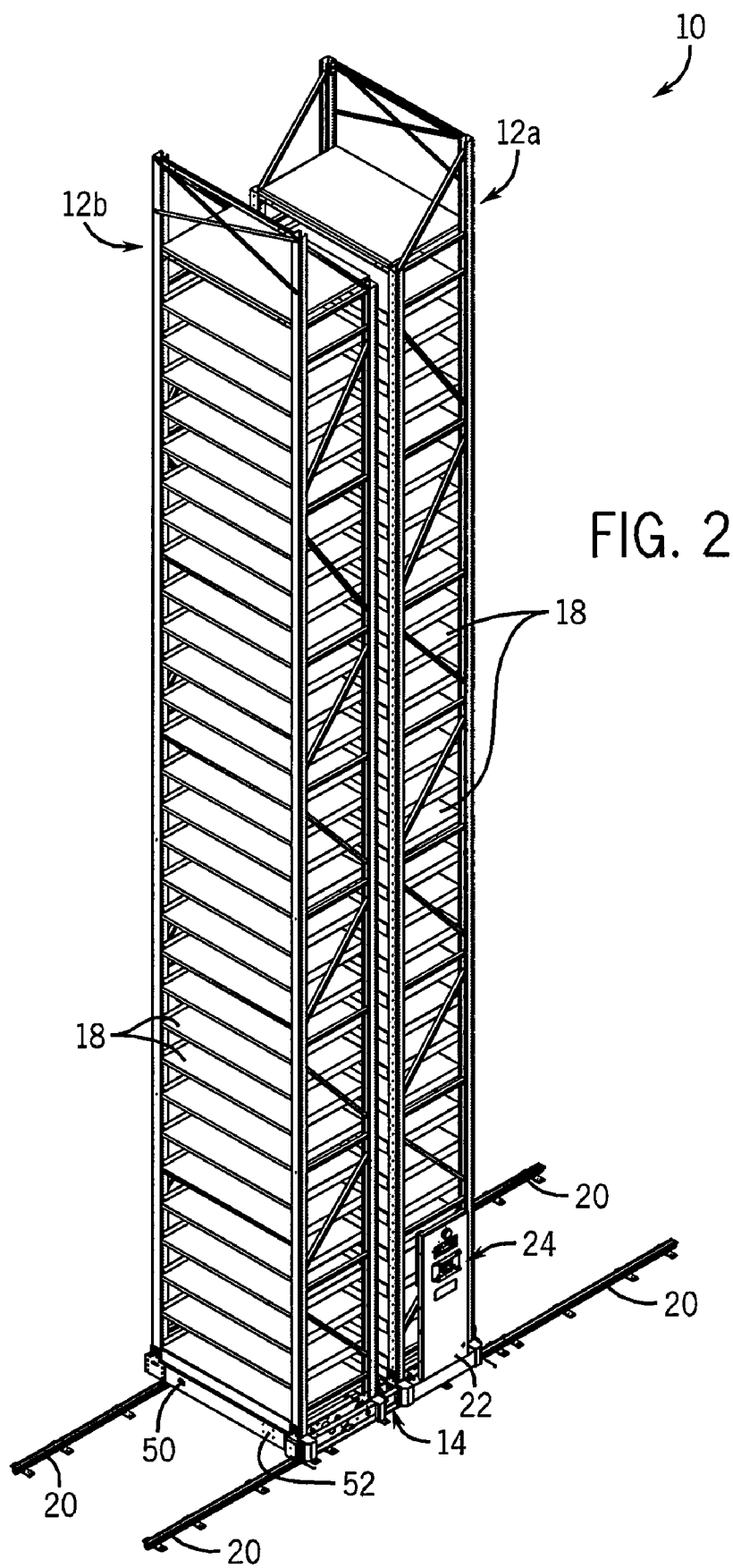
FIG. 2 is an isometric view of a pair of mobile storage units movable along a storage unit guide arrangement according to one embodiment of the invention.

In one version, which is illustrated in FIG. 2, the storage units 12 may be arranged in a back-to-back configuration, in which a pair of adjacent storage units, designated 12a and 12b, are movable together on rails 20 by a shared carriage 14 toward and away from an adjacent pair of storage units (not shown). In the illustrated example, storage unit 12a has an end panel 22 to which various operator controls, generally designated 24, are mounted.

Figure 3:
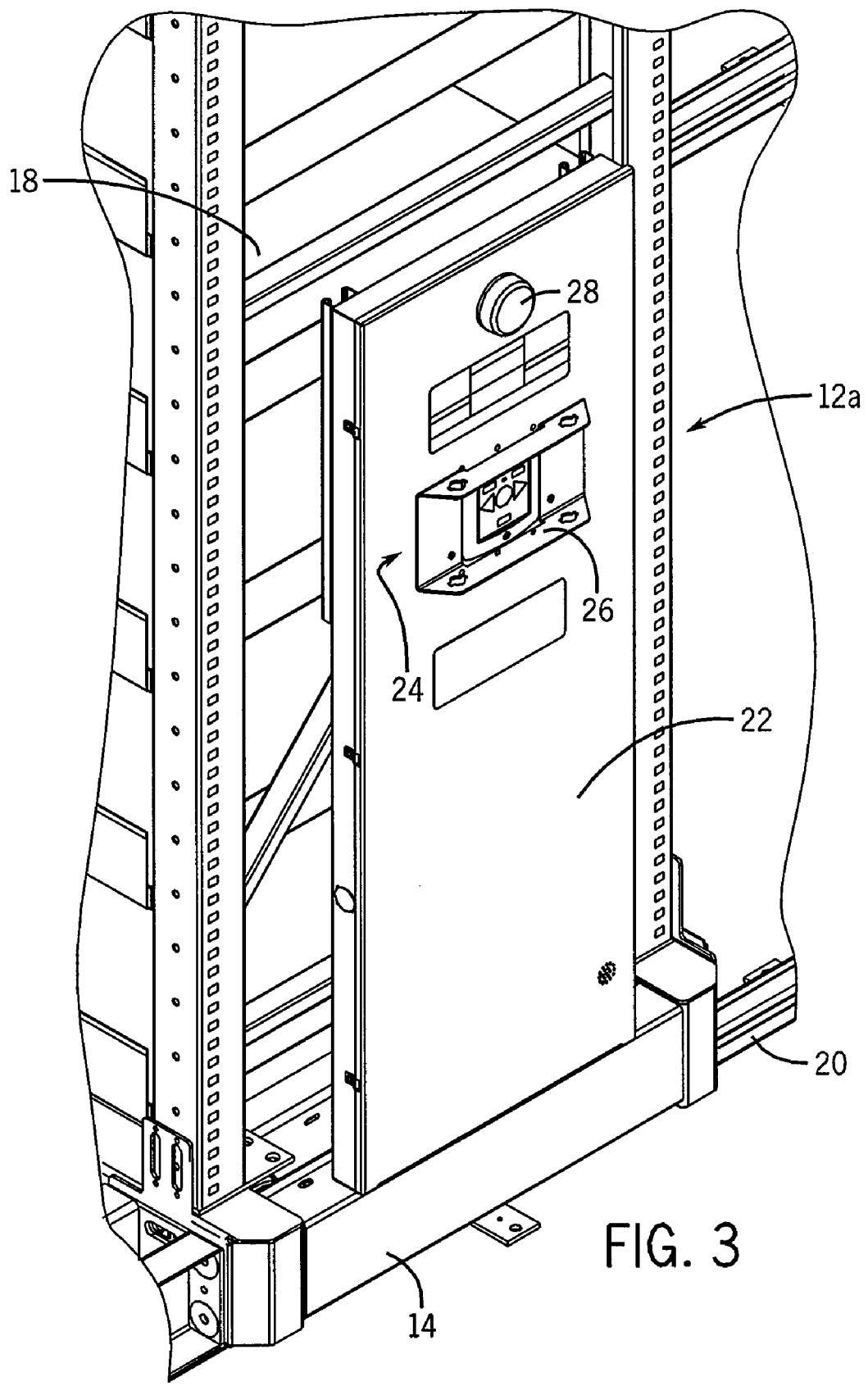
FIG. 3 is an enlarged view of an end panel of one of the mobile storage units shown in FIG. 2.

An enlarged view of the end panel 22 and operator controls 24 are shown in FIG. 3. The controls 24 includes a motion control panel 26 that allows an operator to move the storage unit 12a, and its adjacent storage unit 12b in a back-to-back configuration, along the rails 20. The controls 24 also include an aisle fully open indicator 28, such as a lamp, that is illuminated when an aisle is fully open. As will be explained further below, in storage system 10 it is important that an operator know that the aisle is fully open before a vehicle, such as a forklift, enters the aisle.

While a back-to-back configuration has been described above, it is also understood, however, that each storage unit 12a, 12b may be independently movable relative to the adjacent storage units 12.

Figure 4:
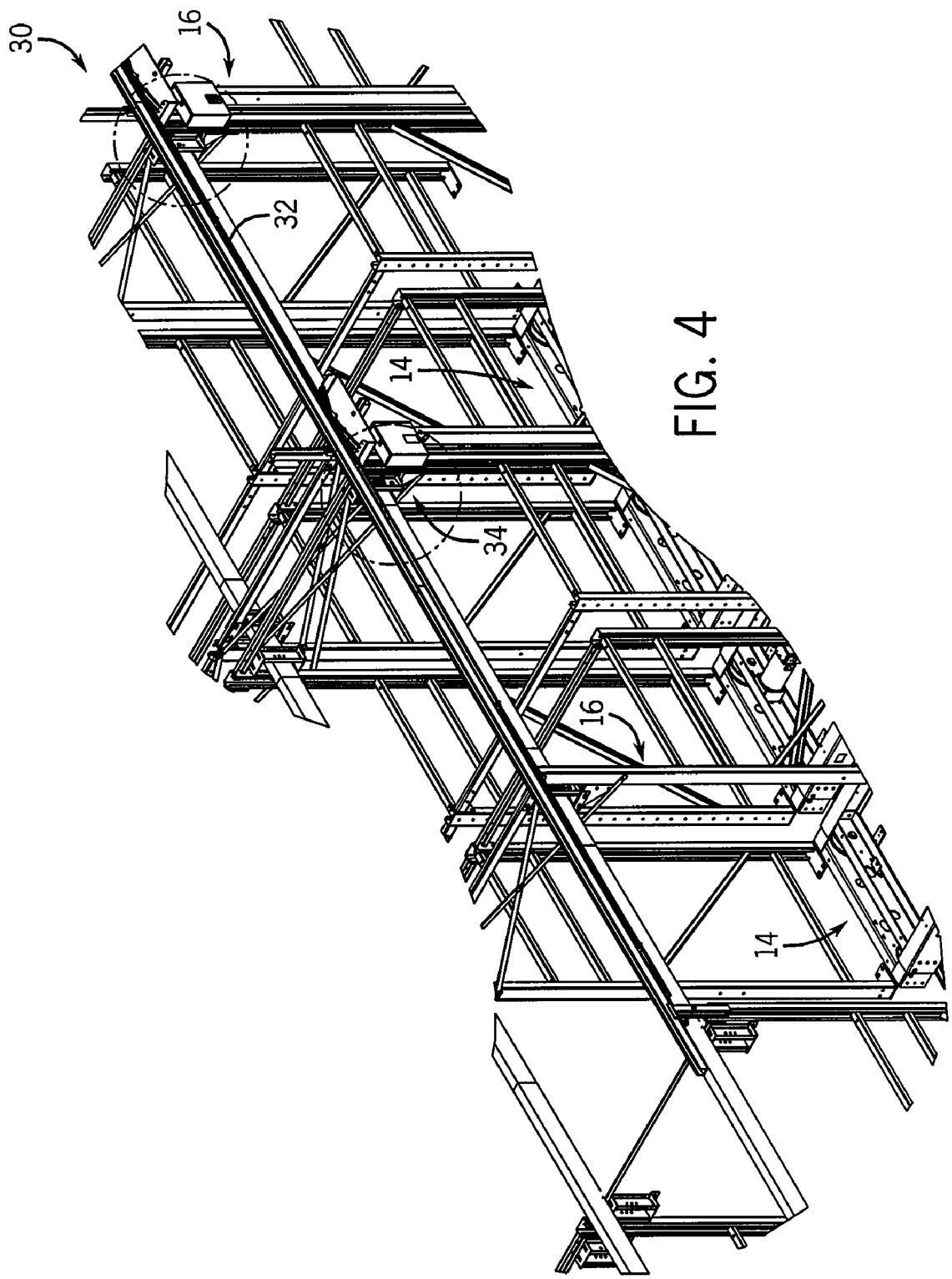
FIG. 4 is a partial isometric view of anti-tip arrangement usable with the mobile storage units shown in FIG. 2.

Referring now to FIG. 4, the upper end of each frame 16 is interconnected with an anti-tip arrangement 30 that includes an anti-tip rail 32 which is secured at its ends to a pair of endmost storage units 12, and the storage units 12 between the endmost storage units are engaged with the anti-tip rail 32 by a movable bracket arrangement 34 that includes a series of rollers that engage anti-tip rail 34 in order to provide relative movement of the storage units 12 while maintaining the storage unit frames 16 in engagement with the anti-tip rail 32. It is understood that other types of anti-tip configurations may be used.

Figure 5:
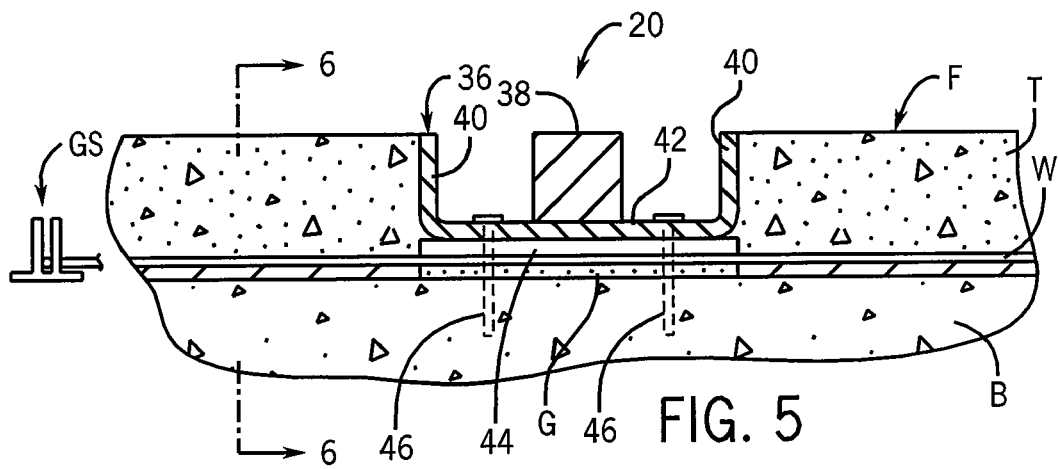
FIG. 5 is a section view of a portion of the storage unit guide arrangement according to one embodiment of the present invention.
Figure 6:
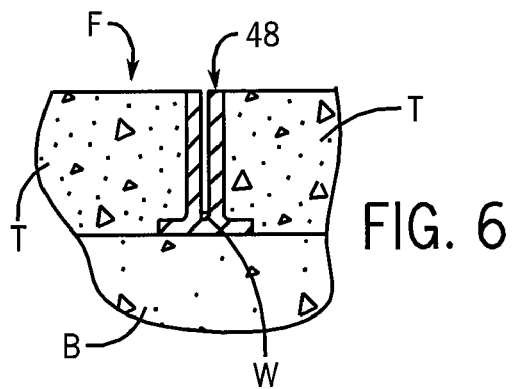
FIG. 6 is a section view of the storage unit guide arrangement of FIG. 5 taken along line 6-6 of FIG. 5.

Referring now to FIG. 5, each rail 20 is embedded within floor F, and preferably is arranged so that the top of the rail 20 is flush with the upwardly facing surface of floor F. In a representative embodiment, rail 20 may include a rail base 36 to which a rail bar 38 is secured. Rail base 36 may be in the form of a channel or U-shaped member defining a pair of side walls 40 and a bottom wall 42. Rail bar 38 may have any satisfactory configuration, and representatively may be a solid metal bar having a square, rectangular or other satisfactory cross-section. In addition, rail 20 may include a base plate 44 to which rail base 36 is secured.

In one construction, rail 20 may be secured to floor F by placing rail 20 in the upwardly facing surface of a base floor or slab B formed of a concrete material, and then placing a second layer of concrete material T on top of the base floor or slab B so as to bring the floor as up to the elevation of the upper surface of rail bar 38. In this construction, floor anchors 46 extend through bottom wall 42 of rail base 36 and into the base floor or slab B so as to secure the rail 20 to base floor or slab B prior to placement of upper layer T.

As will be described further with respect to FIG. 8, a series of guidance and wires W, shown at W1, W2, W3, W4 W5, and W6, are embedded within floor F passing below or through rails 20. Guidance wires W1-W6 are electrical conductors that are supplied with low-voltage electrical power, and function to guide movement of a fork truck, order picker, or other vehicle V when storage units 12 are positioned so as to create an aisle A between adjacent storage units 12. In the illustrated embodiment, a single guidance wire W is provided for each aisle A, and the guidance wires W1-W6 are positioned as to be in the center of the aisle A when the adjacent storage units 12 are moved apart. It is understood, however, that any other number of guidance wires may be provided for each aisle A, and that the guidance wires may be in a position other than in the center of the aisle A.

Figure 7:
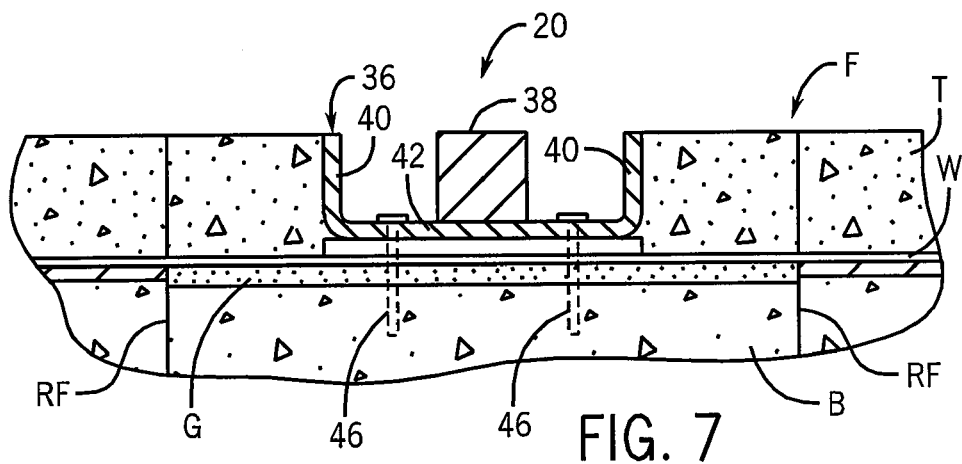
FIG. 7 is a section view of a portion of a storage unit guide arrangement according to an alternate embodiment of the invention.

In the embodiment shown in FIG. 5, each guidance wire W is first positioned relative to its associated rail 20 and base floor or slab B prior to placement of upper layer T. Alternatively, as shown in FIG. 7, if required by the loads to be placed on the storage units 20, the rails 20 may be placed on rail footings, shown at RF.

Representatively, each rail 20 is first placed in the desired position on the upper surface of base floor or slab B (or footing RF), and is leveled and anchored using the anchors 46, in a manner as is known. Grout material, shown at G, is then placed below the rail base plate 44, between the downwardly facing surface of base plate 44 and the upwardly facing surface of base floor or slab B (or footing RF), also in a manner that is known. However, when the grout material G is placed, spacers, conduits or blocks are placed at the locations at which the guide wires W are destined to cross the rails 20. Use of a conduit placed below or through the rail 20 creates a transverse passage embedded within the upper layer T of floor F. Blocks may be used so as to create a void area passing below or through the rail 20, or blocks of foam or like material may be employed. After the upper layer T of floor F is poured to the level of rail 20 and then cured, a cut is made in upper layer T such as by use of a concrete saw or the like, to form an upwardly facing groove, trough or channel 48 within which each wire W is to be placed. If desired, a wire guidance support GS may be embedded in upper layer T to retain the end of the wire W. Each wire W is then placed within one of the upwardly facing grooves, troughs or channels 48. At the location of each rail 20, the cut is made so as to establish communication between the groove, trough or channel 48 formed by the cut and the passage below or through the rail 20. In the case of a conduit placed below or through the rail 20, the cut is made into the end of the conduit so that, when the wire W is placed, the end of the wire is fed through the conduit at the rail 20 and then into the groove, trough or channel 48 formed by the cut on the other side of the rail 20. In the case of blocks that are configured to form a void area at the rail 20, the cut is made through the blocks and the end of the wire W is fed through the void area into the groove, trough or channel 48 formed by the cut on the other side of the rail 20. In the case of a block formed of a foam material or the like, the cut is made in alignment with the foam block, and the foam is then removed from the rail 20 in the area of the foam block that is in alignment with the cuts on either side of the rail 20, to form a passage below or through the rail 20. The end of the wire W is then fed through the passage formed by the removed area of the foam block, to enable the wire W to pass below the rail 20. It is understood that the described methods of positioning the wires W below the rails 20 are representative of numerous other constructions that may be employed to allow the wires W to be placed within the concrete material of upper layer T and passing below or through the rails 20.

After each wire W has been placed within the groove, trough or channel 48 formed by the cuts in upper layer T and passing below or through the rails 20, the void area in each groove, trough or channel 48 above the wire W is filled, typically by use of a foam material that is pressed into the groove, trough or channel 48. A caulk or crack sealer material is then typically placed over the foam material to the level of the upper surface of upper layer T. Again, it is understood that any other satisfactory method may be employed for filling the area of each groove, trough or channel 48 above the wire W.

Figure 8:
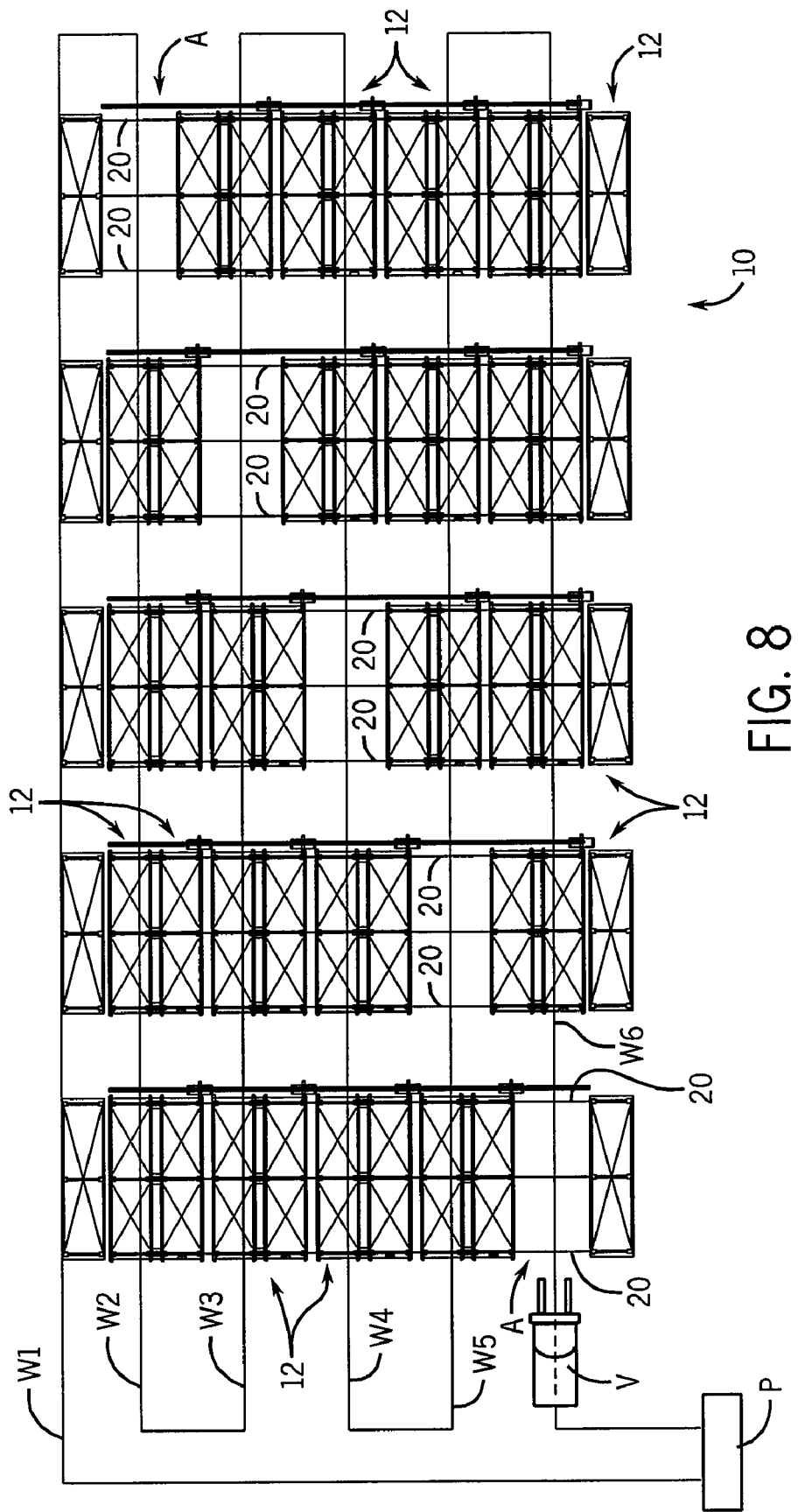
FIG. 8 is a top view of a mobile storage unit system that includes a storage unit guide arrangement and a vehicle guide arrangement.

Referring now to FIG. 8, guidance wires W1-W6 function to guide movement of a vehicle V, such as a fork truck or order picker, within each aisle A. Typically, the wires W1-W6 are placed in a continuous loop, and extend from a power supply box P located in the vicinity of the storage system 10. The guided vehicle V goes 'ON' and 'OFF' the signal of wires W, and travels in either direction as controlled by guided vehicle operator. In a typical installation, an operator drives up to aisle and 'acquires the wire' at the aisle entry area in front of the storage units 12 by flipping a switch on vehicle V when the wire signal is sensed. Once 'on the wire', the operator can only control forward/reverse movement of the vehicle V and lifting or lowering of a load.

Each carriage 14 includes driven and non-driven support assemblies, each of which is located over one of the rails 20. The wheels of the driven support assemblies are rotated by a drive arrangement that may include a motor and a force transmission mechanism, such as a chain and sprocket arrangement, which extends from the output of the motor and is engaged with a driven wheel.

The present invention also includes an aisle fully open indicator 28, such as the lamp 28, shown in FIG. 3, which provides an indication to a person, such as the operator of vehicle V, that an aisle A is fully open and that vehicle V can be driven into the aisle A. In storage system 10, it is important for the operator to know that the aisle A is fully open prior to entering to aisle with vehicle V, since the aisle A is typically very narrow and there are very small clearances between the side of the vehicle V in the outwardly facing surfaces of the storage units and carriages 14 that form the aisles A. The aisle fully open indicator 28 may be in the form of an indicator light, which is provided on a panel 22 secured at the end of the storage unit 12 at the main transverse aisle.

Referring again to FIG. 2, each carriage 14 is provided with at least one distance measuring sensor 50 and a reflector 52 that cooperates with the sensor of an adjacently spaced carriage. Each sensor 50 measures the distance or spacing from the adjacent carriage. Thus, when the storage units 12 are being moved so as to create an aisle A, the output of the sensors 50 will indicate whether the adjacent the storage unit is in a fully open position. When a fully open aisle is formed, only one sensor 50 will provide an open aisle signal. When that open aisle signal is provided, the indicator light 28 is illuminated so as to provide an indication that the aisle A being opened has attained a fully open condition. The operator can then advance the vehicle into the aisle A to place or retrieve items on or from the storage units 12. If indicator light 28 is not illuminated, then the operator knows that the aisle A is not fully opened, and that the vehicle V should not be advanced into the aisle A.

It is recognized that the distance that equates to a fully open aisle can be varied using appropriate software.

In a further embodiment of the invention, the carriages 14, and thus the mobile storage units 12, are specially controlled when a fault, such as a safety condition, is detected. For instance, if a safety sensor is activated, such as by tripping of an aisle safety sensor, the mobile storage units 12 moving away from the aisle in which the fault was detected are allowed to continue movement in the direction away from the aisle. However, those storage units moving toward the aisle in which the fault was detected are automatically stopped when the fault is detected. Once the storage moving toward the aisle in which the fault was detected are stopped, a timer counts down for a predetermined time period, e.g. 3 seconds, in order to ensure that all movement of the storage units has ceased, and to allow forces caused by movement of the storage units to dissipate. Once the timer expires, the aisle in which the safety was activated will open for a predetermined time period, e.g. 3 seconds, or until its movement limit sensor is reached or a safety activation stops movement, or a user commands the system to stop. In this manner, in the event an obstruction such as a forklift is encountered when an aisle is closing, the storage units are backed away from the obstruction to widen the aisle and therefore allow the aisle to be cleared. After the obstruction is removed from the aisle, the safety system continues to keep the aisle locked. The user must manually reset the locked aisle so that the storage units can again be moved to allow aisles to be formed between storage units as desired.

It is understood that the mobile storage units moving away from the aisle having the fault may also be paused and thus treated similarly to those mobile storage units moving toward the aisle having the fault.

While the aisle fully open indicator has been shown as indicator light, it is understood that any other means may be employed to provide a perceptible signal to an operator that the aisle is fully open. For example, an audible signal may be employed. In addition, while the aisle fully open indicator has been shown and described as a device that provides a perceptible signal to the operator when the aisle is fully open, it is also contemplated that a perceptible signal may be generated when the aisle is not fully opened, and that cessation or alteration of the perceptible signal may then be used to signal to the operator that the aisle is fully open.

It is also understood that any satisfactory mechanism other than the carriage position sensors may be employed for determining whether aisle A is fully open, and for actuating the aisle fully open indicator. For example, mechanical limit switches may be mounted to the carriages 14, and may be used to actuate the perceptible signal. For example, an aisle is not fully open unless all of the limit switches are in the same state, either latched ON or latched OFF. When the storage units are moving, at least one storage unit will have a limit switch that is in a state different from the limit switches of the other storage units.

It is further contemplated that the work vehicle may be equipped with an open aisle indicator that operates similarly to the open aisle indicator 28 described above. The work vehicle indicator thereby provides a perceptible indicator to the operator within the operator cab itself as to whether the aisle is fully open before the operator enters the work vehicle into the aisle.

In addition to the bar-type rails 20 as shown and described above, it understood that other types of rails may be use in storage system 10, such as a center groove rail adapted to receive center-flanged carriage wheels, or a flat rail to supports a flat-surfaced carriage wheel such as is defined by a flat or a double-flanged carriage wheel.

Various alternatives and embodiments are contemplated as being within the scope of the following claims particularly pointing out and distinctly claiming the subject matter regarded as the invention.

We claim:

1. A mobile storage system, comprising:
   a support surface;
   a plurality of mobile storage units;
   a storage unit guide arrangement for guiding movement of the mobile storage units relative to the support surface, wherein the mobile storage units are movable via the storage unit guide arrangement to selectively form at least one aisle between adjacent storage units; and
   a vehicle guide arrangement associated with the support surface and configured in a predefined continuous loop extending back and forth through the storage units and across the storage unit guide arrangement for guiding movement of a vehicle in each aisle between adjacent storage units.

2. The mobile storage system of claim 1, wherein the storage unit guide arrangement is associated with the support surface and interacts with the storage units to guide movement of the storage units relative to the support surface.

3. The mobile storage system of claim 2, wherein the storage unit guide arrangement comprises a series of rails secured to the support surface, wherein each storage unit includes a wheel arrangement that is movable on the rails to move the storage units relative to the support surface.

4. The mobile storage system of claim 3, wherein the vehicle guide arrangement comprises a series of axially extending guide wires secured to the support surface, wherein the guide wires are located so as to guide movement of the vehicle in each aisle.

5. The mobile storage system of claim 4, wherein the support surface a floor, and wherein each guide wire is embedded within the floor.

6. The mobile storage system of claim 5, wherein the rails are embedded within the floor, and wherein the guide wires are embedded within the floor passing below or through the rails.

7. The mobile storage system of claim 1 wherein a mobile storage unit includes a panel secured at an end of the storage unit and further comprising an open aisle indicator provided on the panel.

8. The mobile storage system of claim 7 wherein the indicator is configured to illuminate only when a fully open aisle is formed between a pair of mobile storage units.

9. The mobile storage system of claim 1 further comprising an aisle fault sensor arrangement that suspends motion of any mobile storage units when a fault in an aisle is detected.

10. The mobile storage system of claim 9 wherein the aisle fault sensor arrangement is further configured to reverse the motion of any mobile carriage that was moving in toward the aisle in which the fault was detected.

11. The mobile storage system of claim 9 wherein the aisle fault sensor arrangement is configured to suspend motion of the mobile storage unit for a limited predefined period of time.

12. A storage method, comprising the acts of:
   movably mounting a plurality of storage units relative to a support surface;
   providing a vehicle for selectively placing items on and retrieving items from the storage units;
   selectively moving the storage units to form an aisle between a pair of adjacent storage units; and
   guiding movement of the vehicle through each aisle along a predefined path formed along the support surface and configured in a continuous loop extending back and forth through the storage units.

13. The method of claim 12, wherein the act of movably mounting the storage units relative to the support surface is carried out by mounting the storage units on rails embedded below the support surface.

14. The method of claim 12, wherein the act of guiding movement of the vehicle on the support surface is carried out by means of a guide wire arrangement embedded below the support surface.

15. A mobile storage system, comprising:
   a support surface;
   a plurality of mobile storage units;
   a storage unit guide arrangement for guiding movement of the mobile storage units relative to the support surface, wherein the mobile storage units are movable via the storage unit guide arrangement such that at least one storage unit in each pair of adjacent storage units is movable from a closed position throughout a range of partially open positions to a fully open position in which an aisle is formed between the pair of adjacent storage units and sized to receive a vehicle for selectively supplying and retrieving items relative to the storage units;
   an indicator associated with each adjacent pair of storage units for providing a perceptible indication that the storage units are in the fully open position, and
   a vehicle guide arrangement associated with the support surface and configured in a predefined continuous loop extending back and forth through the storage units and across the storage unit guide arrangement for guiding movement of the vehicle in each aisle between adjacent storage units.

16. The mobile storage system of claim 15, wherein the indicator comprises a light for providing a visual indication that the storage units are in the fully open position.

17. The mobile storage system of claim 15 wherein the storage unit guide arrangement is associated with the support surface and interacts with the storage units to guide movement of the storage units relative to the support surface.

18. The mobile storage system of claim 17, wherein the storage unit guide arrangement comprises a series of rails secured to the support surface, wherein each storage unit includes a wheel arrangement that is movable on the rails to move the storage units relative to the support surface.

19. The mobile storage system of claim 18, wherein the vehicle guide arrangement comprises a series of axially extending guide wires secured to the support surface, wherein the guide wires are located so as to guide movement of the vehicle in each aisle.

20. The mobile storage system of claim 19, wherein the support surface comprises a floor, and wherein each guide wire is embedded within the floor.

21. The mobile storage system of claim 20, wherein the rails are embedded within the floor, and wherein the guide wires are embedded within the floor passing below or through the rails.

22. A storage method, comprising the acts of:

movably mounting a plurality of storage units relative to a support surface;

selectively moving the storage units to form an aisle between a pair of adjacent storage units, by moving at least one of the storage units in each adjacent pair of storage units from a closed position throughout a range of partially open positions to a fully open position in which the aisle is formed and sized to receive a vehicle for travel therethrough;

providing a perceptible indication when the storage units are in the fully open position to form the aisle and receive the vehicle; and moving the vehicle into the aisle along a predefined guide arrangement formed along the support surface and configured in a continuous loop extending back and forth through the storage units after providing the perceptible indication so as to place an item on or retrieve an item from one of the storage units.

23. The storage method of claim 22, wherein the act of providing a perceptible indication is carried out by providing a visual indication.

* * * * *

UNITED STATES PATENT AND TRADEMARK OFFICE
CERTIFICATE OF CORRECTION

| | | |
|---|---|---|
| PATENT NO. | : 7,829,838 B2 | Page 1 of 1 |
| APPLICATION NO. | : 12/132470 | |
| DATED | : November 9, 2010 | |
| INVENTOR(S) | : Mark P. Haubenschild et al. | |

It is certified that error appears in the above-identified patent and that said Letters Patent is hereby corrected as shown below:

Col. 8, lines 6-8 should read

5. The mobile storage system of claim 4, wherein the support surface --comprises-- a floor, and wherein each guide wire is embedded within the floor.

Signed and Sealed this

Twenty-first Day of December, 2010

David J. Kappos
*Director of the United States Patent and Trademark Office*